(12) United States Patent
Hirayama

(10) Patent No.: US 7,265,775 B2
(45) Date of Patent: Sep. 4, 2007

(54) THREE-DIMENSIONAL DISPLAY APPARATUS

(75) Inventor: Yuzo Hirayama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 734 days.

(21) Appl. No.: 10/386,492

(22) Filed: Mar. 13, 2003

(65) Prior Publication Data

US 2003/0184571 A1   Oct. 2, 2003

(30) Foreign Application Priority Data

Mar. 28, 2002 (JP) ............... 2002-092455
Mar. 29, 2002 (JP) ............... 2002-097048

(51) Int. Cl.
*H04N 7/18* (2006.01)

(52) U.S. Cl. ......................... 348/56; 348/59
(58) Field of Classification Search .......... 348/36–62
See application file for complete search history.

(56) References Cited

U.S. PATENT DOCUMENTS

| | | | | |
|---|---|---|---|---|
| 6,069,650 | A * | 5/2000 | Battersby | 348/59 |
| 6,233,003 | B1 * | 5/2001 | Ono | 348/47 |
| 6,980,248 | B1 * | 12/2005 | Suda | 348/335 |
| 7,012,749 | B1 * | 3/2006 | Mendlovic et al. | 359/560 |
| 7,064,895 | B2 * | 6/2006 | Morishima et al. | 359/463 |

FOREIGN PATENT DOCUMENTS

| | | |
|---|---|---|
| JP | 61-173289 | 8/1986 |
| JP | 06-160770 | 6/1994 |
| JP | 07-248468 | 9/1995 |
| JP | 07-318858 | 12/1995 |
| JP | 10-239785 | 9/1998 |
| JP | 11-352613 | 12/1999 |
| JP | 2001-056450 | 2/2001 |
| WO | WO-99/50702 | 7/1999 |
| WO | WO 00/59235 | 10/2000 |

OTHER PUBLICATIONS

Ishida, et al., "System of Interactive Three-Dimensional Display", 2002 Conference Record at the Institute of Electronics, Information and Communication Engineers, pp. 142-143, Mar. 7, 2002.

(Continued)

*Primary Examiner*—Andy Rao
(74) *Attorney, Agent, or Firm*—Finnegan, Henderson, Farabow, Garrett & Dunner, L.L.P.

(57) ABSTRACT

A three-dimensional image display apparatus comprising a display panel, which displays a parallel projection image corresponding to a three-dimensional image, and an array plate disposed on a front of the display panel and having pinholes arranged two-dimensionally. The display panel includes pixels arranged two-dimensionally in correspondence with the pinholes. Each of the pixels can include a first subpixel, a second subpixel, and a third subpixel. The apparatus also includes a point at which a line passing through one of the pinholes from the first subpixel intersects the three-dimensional image, a point at which a line passing through the one of the pinholes from the second subpixel intersects the three-dimensional image, and a point at which a line passing through the one of the pinholes from the third subpixel intersects the three-dimensional image being separated from one another.

18 Claims, 12 Drawing Sheets

OTHER PUBLICATIONS

Notification of Reasons for Rejection from the Japanese Patent Office, mailed Feb. 3, 2006, in Patent Application No. 2002-092455, and English translation thereof.

Notification of Reasons for Rejection from the Japanese Patent Office, mailed Aug. 23, 2005, in Patent Application No. 2002-097048, and English translation thereof.

Hamagishi, G. et al., "Development of a Color 3-D Display Visible to Plural Viewers at the Same Time Without Special Glasses by Using a Ray-Regenerating Method", Proc. SPIE, vol. 4660, pp. 275-284 (2002).

* cited by examiner

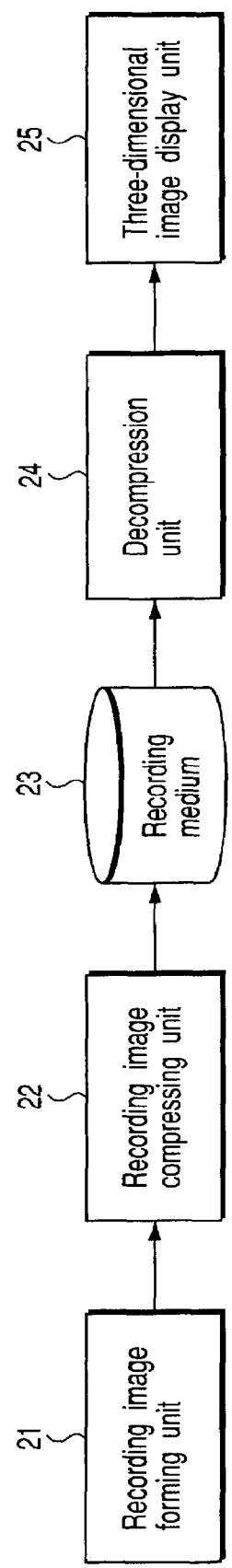
F I G. 17A

THREE-DIMENSIONAL DISPLAY APPARATUS

CROSS-REFERENCE TO RELATED APPLICATIONS

This application is based upon and claims the benefit of priority from the prior Japanese Patent Applications No. 2002-92455, filed Mar. 28, 2002; and No. 2002-97048, filed Mar. 29, 2002, the entire contents of both of which are incorporated herein by reference.

BACKGROUND OF THE INVENTION

1. Field of the Invention

The present invention relates to a three-dimensional image display apparatus.

2. Description of the Related Art

As one of three-dimensional display methods to enable a three-dimensional display used in amusement, Internet shopping, carrying terminal, medical care, virtual reality, an advertisement signboard, and so on, there is a stereoscope system that displays plane images for right and left eyes on a display screen, to watch the right eye plane image with the right eye and the left eye plane image with the left eye, using polarized light.

The stereoscope system requires polarized glasses for a viewer, for example, in order to see the right eye plane image with the right eye and the left eye plane image with the left eye. This stereoscope system can make an image seen three-dimensionally. However since it does not play back three-dimensional image really, even if the viewer changes position to look at the image, the image does not change. In other words, even if the viewer changes the position to look at the side and top face of the image, he or she cannot see the side and top face of the image. Therefore, the stereoscope system has a problem in reality.

Further, in the stereoscope system, an accommodation position exists on a display screen, a spatial displacement occurs between the accommodation position and the convergence location at which a gaze object exists. More specifically, mismatch occurs between accommodation and convergence distance, and a playback space makes a viewer feel sense of incongruity, to be easy to give fatigue to the viewer.

As a three-dimensional display method for solving these problems is known a method referred to as an integral photography method or a light beam reproduction method using a great number of parallax images (Jpn. pat. Appln. KOKAI Publication 10-239785, and Jpn. pat. Appln. KOKAI Publication No. 2001-56450). The method records a three-dimensional image by means of some manners and plays back it as a three-dimensional image. The integral photography method or light beam reproduction method is not established in semantics of a vocabulary as a three-dimensional display method precisely, but based on approximately the same principle. An integral photography using a pinhole array plate, for example, is well known from a long time ago. This can be referred to as the light beam reproduction method. An integral photography method as a concept including a light beam playback method will be described hereinafter.

A three-dimensional display apparatus using the integral photography method comprises a display device such as a liquid crystal display panel and an array plate having pinholes arrayed two-dimensionally, and plays back a natural three-dimensional image by a simple optical system. The integral photography method can form a natural three-dimensional image with a simple configuration. Since the integral photography method reproduces a three-dimensional image really, polarized glasses are not required, and the observed three-dimensional image changes in correspondence with the angle at which a viewer watches the three-dimensional image. Thus, the three-dimensional image represents a feeling of more reality. However, it is difficult that the integral photography method reproduces a high definition three-dimensional image. Since the integral photography method plays back a three-dimensional image using light beams emitted from element image via a pinhole, three-dimensional image must be displayed using many element images that are arranged two-dimensionally.

Light beams of a desired color and luminance are emitted from a pixel (referred to as triplet) having subpixels of R (red), G (green) and B (blue) through a pinhole. Increase of the number of light beams emitted from the pinhole increases the three-dimensional effect. However, since the number of pixels of a display panel is limited, the number of pinholes also is limited. In other words, since the number of pinholes is equal to the number of plane pixels usable as the three-dimensional display, the three-dimensional image is missed in fineness.

Further, the integral photography method or light beam reproduction method needs data compression due to a great amount of data. The definition of the reproduced three-dimensional image deteriorates significantly due to this data compression.

It is an object of the present invention to provide a three-dimensional display apparatus that can display a high definition three-dimensional image.

BRIEF SUMMARY OF THE INVENTION

According to a first aspect of the invention, there is provided a three-dimensional image display apparatus comprising: a display panel which displays a parallel projection image formed from a plurality of patterns corresponding to a three-dimensional image to be displayed; and an array plate disposed on a front of the display panel and having a plurality of pinholes arranged two-dimensionally to form the three-dimensional image on a front or a rear of the array plate, wherein the display panel includes a number of pixels arranged two-dimensionally in correspondence with the pinholes, wherein each of the pixels comprises a first subpixel, a second subpixel and a third subpixel, and wherein a first intersection point, a second intersection point and a third intersection point are formed at the three-dimensional image and are separated from one another, the first intersection point being formed where a first line that passes through one of the pinholes from the first subpixel intersects the three-dimensional image, the second intersection point being formed where a second line that passes through the one of the pinholes from the second subpixel intersects the three-dimensional image, and the third intersection point being formed where a third line that passes through the one of the pinholes from the third subpixel intersects the three-dimensional image.

According to a second aspect of the invention, there is provided a three-dimensional image display apparatus comprising: a display panel which displays a parallel projection image formed from a plurality of patterns corresponding to a three-dimensional image to be displayed; and an array plate disposed on a front of the display panel and having a plurality of microlens arranged two-dimensionally to form the three-dimensional image on a front or a rear of the array plate, wherein the display panel includes a number of pixels arranged two-dimensionally in correspondence with the microlens, wherein each of the pixels comprises a first subpixel, a second subpixel and a third subpixel, and wherein a first intersection point, a second intersection point and a third intersection point are formed at the three-dimensional image and are separated from one another, the first intersection point being formed where a first line that passes through one of the microlens from the first subpixel intersects the three-dimensional image, the second intersection point being formed where a second line that passes through the one of the microlens from the second subpixel intersects the three-dimensional image, and the third intersection point being formed where a third line that passes through the one of the microlens from the third subpixel intersects the three-dimensional image.

BRIEF DESCRIPTION OF THE SEVERAL VIEWS OF THE DRAWING

FIG. 5 shows a conceptual diagram of a display panel of the three-dimensional image playback apparatus related to the first embodiment;

FIG. 8 shows a conceptual diagram of a display panel of a three-dimensional image display apparatus related to a fourth embodiment of the present invention;

FIG. 9 shows a conceptual diagram of a display panel of a three-dimensional image display apparatus related to a fifth embodiment of the present-invention;

FIG. 10 shows a conceptual diagram of a display panel of a three-dimensional image display apparatus related to a sixth embodiment of the present invention;

FIG. 11 shows a conceptual diagram of a display panel of a three-dimensional image display apparatus related to a seventh embodiment of the present invention;

FIG. 12 shows a conceptual diagram of a display panel of a three-dimensional image display apparatus related to an eighth embodiment of the present invention;

FIG. 17A is a block diagram of a three-dimensional image playback system using the three-dimensional image display apparatus of the present invention;

DETAILED DESCRIPTION OF THE INVENTION

A three-dimensional image display of the present invention will now be described concretely with reference to drawings. The present invention is attained paying attention to a human eye has a characteristic that is sensitive to luminance, but insensitive to a color. Further, the present invention pays attention to that color separation is a few because a group of different color light beams overlaps in space.

FIRST EMBODIMENT

Figure 1:
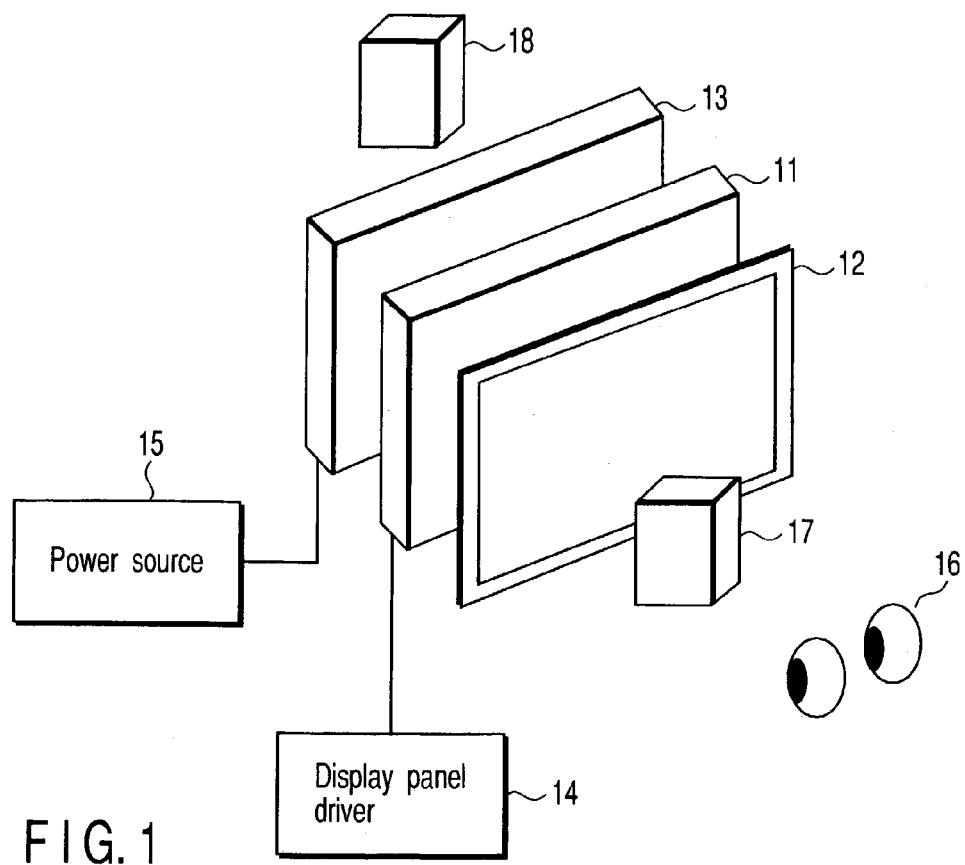
FIG. 1 shows a schematic perspective diagram of a three-dimensional image display apparatus according to a first embodiment of the invention.
Figure 2:
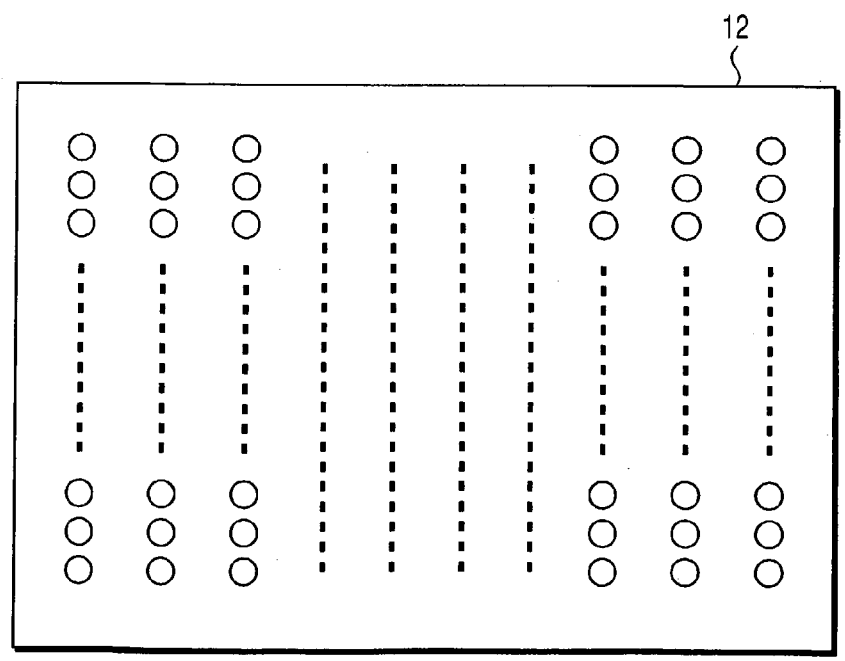
FIG. 2 shows a plan view of a pinhole array plate.

The three-dimensional image display apparatus shown in FIG. 1 comprises a display panel 11 such as a liquid-crystal display panel, a pinhole array plate 12 disposed on the front side of the display panel 11 and a back light 13 disposed on the back side of the display panel 11. The display panel 11 is connected to a display panel driver 14 and the back light 13 is connected to a power supply 15. A large number of pinholes are formed in the pinhole array plate 12 as shown in FIG. 2. The three-dimensional display apparatus of the above configuration forms a real image 17 of a three-dimensional image on its front side and forms a virtual image 18 thereof on its back side. The status that the three-dimensional image is formed by the three-dimensional image display apparatus of the present embodiment will be described referring to FIG. 3.

On the liquid-crystal display panel 11 located on the rear of the pinhole board 12 with respect to a viewer is displayed a parallel projection image formed from a multiple-viewpoint image which is a number of patterns corresponding to a group of parallax images whose appearances subtly vary depending upon the angle of view. The light beams irradiated from these multiple-viewpoint images passes through the corresponding pinholes 121, respectively, to form a group of parallax image light beams. The parallax image light beams are condensed to reconstruct a three-dimensional image 22.

In this case, the smallest unit for driving the display panel is each subpixel, that is, R (red), G (green) or B (blue). A pixel is formed by three subpixels R, G and B.

Figure 3:
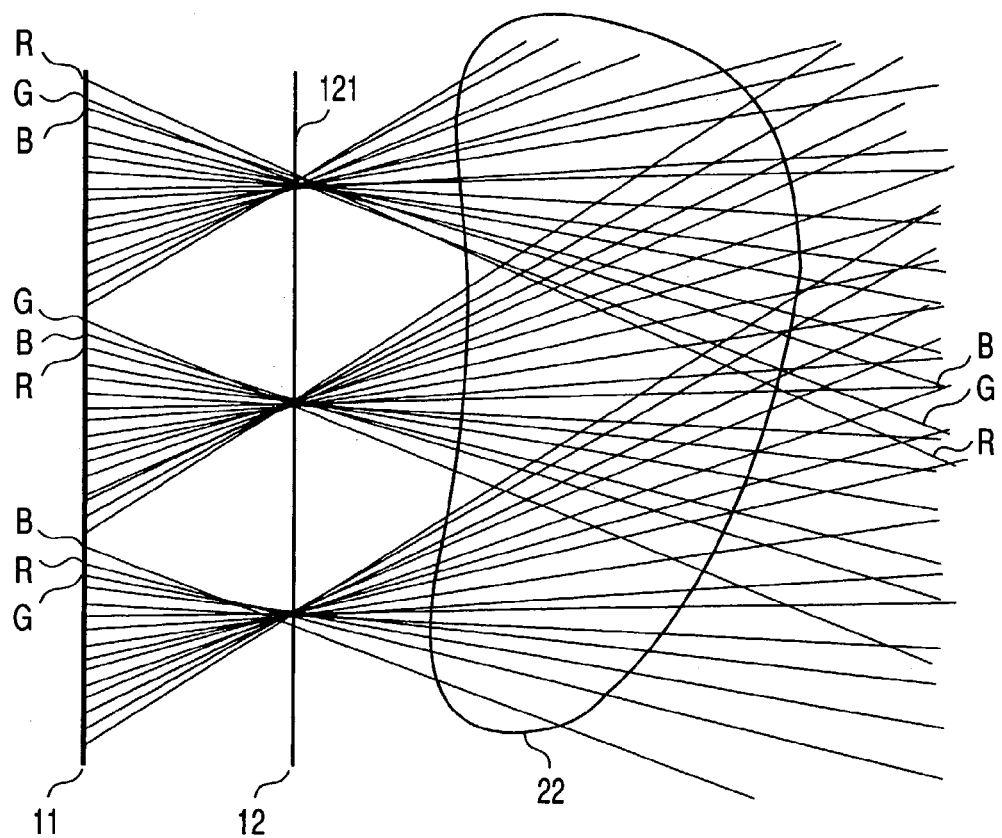
FIG. 3 shows a conceptual diagram of the three-dimensional image display apparatus related to the first embodiment of the present invention.

The points where the lines passing through the center of the pinhole 121 from the subpixels R, G and B intersect a three-dimensional image are separated into R, G and B as shown on the right side in FIG. 3. The three-dimensional image 22 can be displayed on at least one of the front and rear of the array plate 12 on which a number of pin holes are arranged two-dimensionally. There are a plurality of points where a line intersects the three-dimensional image, but the point nearest to the viewer is selected. The pitch of the pinholes is smaller than the pitch of the corresponding pixels.

Figure 4:
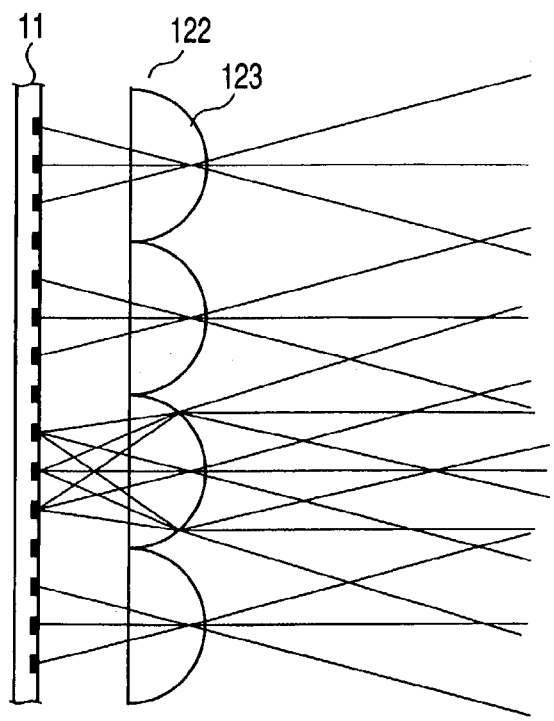
FIG. 4 shows a conceptual diagram of a main portion of a three-dimensional image playback apparatus using a microlens array.

FIG. 4 shows a three-dimensional image display apparatus using a microlens array plate 122. This microlens array plate 122 comprises a large number of microlens 123 arranged two-dimensionally, similarly to the pinhole board 12 shown in FIG. 2. Light beams emitted from the pixels of the liquid-crystal display panel 11 are incident to each microlens 123, and are converged by the microlens 123 to form a group of a large number of parallax image light beams thereby reconstructing a three-dimensional image.

Figure 5:
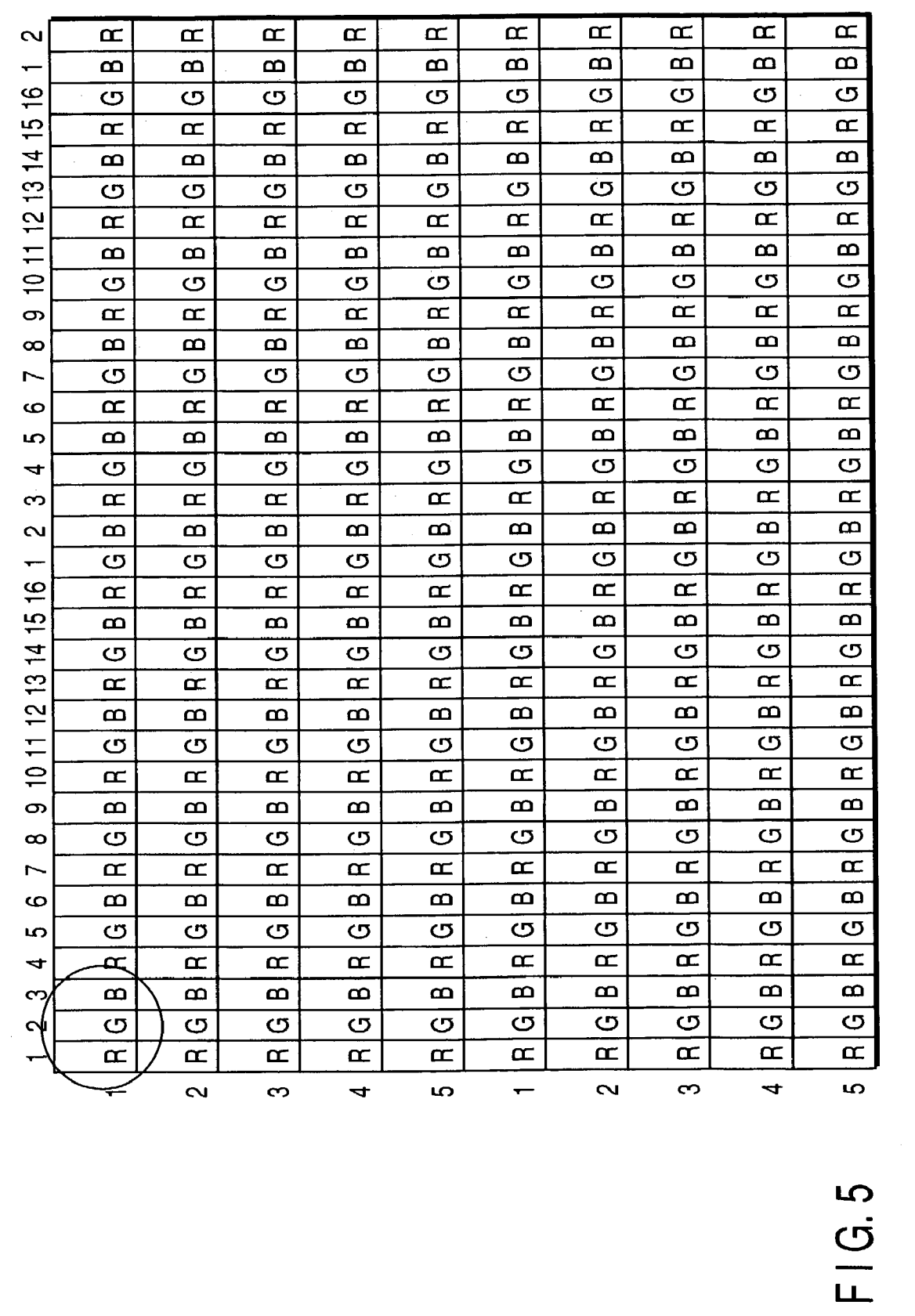

FIG. 5 shows a relation between an array of subpixels of the display panel 11 and the corresponding parallax (viewpoint). The width of the subpixel is 50 μm, and the vertical length thereof is 150 μm. The first to sixteen parallaxes in a horizontal direction are periodically assigned to the subpixels. The first to fifth parallaxes in a vertical direction are periodically assigned to the subpixels. The part surrounded by a circle is a unit (triplet) of pixels R, G and B.

This three-dimensional display apparatus plays back a three-dimensional image by means of the light beams emitted from the subpixels of R, G and B. n subpixels R, G and B emit light beams via the corresponding pinhole as element images. The intersection of the light beams is a new luminescence point. When the pinhole is sufficiently larger than the subpixel in size, n may be an arbitrary natural number. When the pinhole is approximately equal to or smaller than the subpixel in size, it is desirable that n should not be a multiple of 3. If n is a multiple of 3, when an image is observed from a certain inspection position, all light beams become the same color. When n is not a multiple of 3, the display apparatus makes a state that the light beams of subpixels R, G and B emit from each pinhole in turn.

The pinhole may be a rectangle of 50 μm wide×150 μm long in correspondence with the size of a single subpixel. As a result, the number of the light beams can be largely increased. Therefore, the high definition three-dimensional image can be played back.

When a display panel of, for example, 1024×768 pixels and a pixel pitch of 150 μm is used, even if the number of the light beams of a horizontal direction per one pinhole is 16, the number of pixels of the horizontal direction is 1024×3÷16=192. The pixel pitch is 50 μm×16=800 μm. Even if the same display panel is used, the definition of the image can be extensively improved in comparison with the conventional display apparatus.

Since the light beams of the subpixels R, G and B are emitted from each pinhole in turn with respect to color information, the light beams from three pinholes give a viewer color information.

SECOND EMBODIMENT

Figure 6:
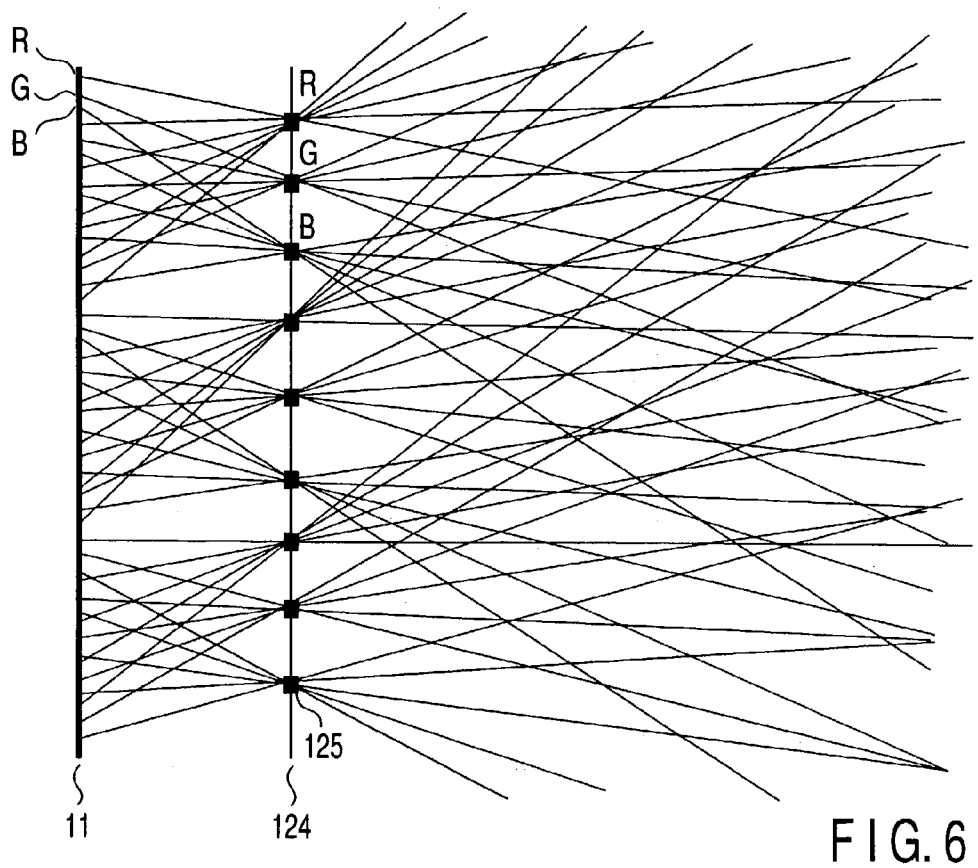
FIG. 6 shows a conceptual diagram of a three-dimensional image display apparatus related to a second embodiment of the present invention.

FIG. 6 is a schematic diagram of a three-dimensional image display according to the second embodiment of the present invention.

A plurality of collar pinholes having colors R, G and B or a plurality of microlens with color filters are provided every element image pattern. In the present embodiment, the pinholes or microlens are further separated and disposed.

A parallel projection image formed from a multiple-viewpoint image is displayed on the liquid crystal display panel 11, and the pinhole array 124 is disposed before the display panel 11.

A number of pattern images are displayed on the liquid crystal display panel 11. The light beams emitted from the pattern images are condensed via corresponding pinholes 125 and played back as a three-dimensional image.

In this embodiment, color filters are installed in the pinholes. A multiple-viewpoint image comprises an array of subpixels R, G and B. The pinholes or microlens are separately arranged in correspondence with each subpixel. A three-dimensional image is played back by a group of light beams passing through collar pinholes of the same color from the subpixels.

This three-dimensional display apparatus plays back a three-dimensional image by the light beams emitted from the subpixels of R, G and B and passed through the pinholes provided with color filters of the same color. For this case, the number of the light beam images is three times that of the images obtained by a single pinhole. Since a color liquid crystal display can be used as a pinhole plate with a color filter, the present embodiment can be carried out extremely simple and easy. When a pixel of the color liquid crystal display is displayed in red, only the subpixel R can pass a red light beam. This color liquid crystal display has a function similar to that of the pinhole with a red color filter.

In the three-dimensional display apparatus shown in the present embodiment, a high quality three-dimensional image is viewed. In addition, if the color of the color filter is changed with time by something means, more natural three-dimensional image can be provided. If the color of a certain pixel is sequentially changed into R, G and B, using, for example, a color liquid crystal display, approximately the same effect as what the color of a color filter is changed can be obtained. The position of the pinhole is displaced by a size of the subpixel, but the multiple-viewpoint image is formed corresponding to the displacement. The number of the light beams can be increased by this method and further the luminescence points increase. As a result, a high definition three-dimensional image can be obtained.

THIRD EMBODIMENT

Figure 7:
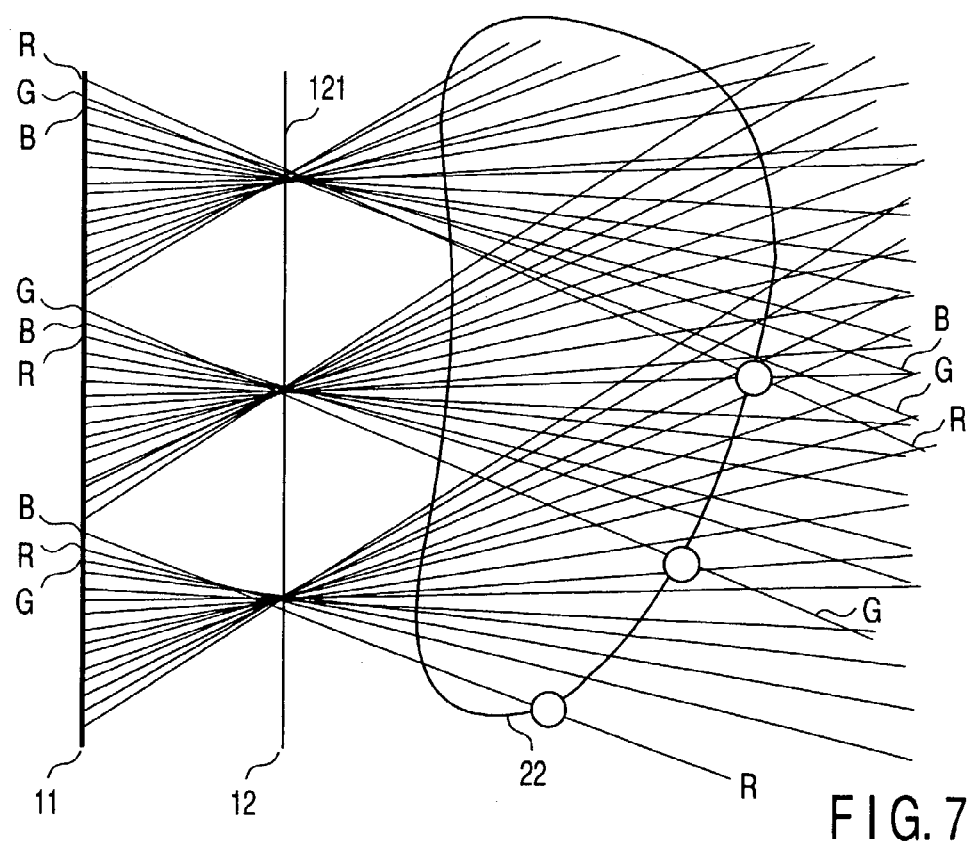
FIG. 7 shows a conceptual diagram of a three-dimensional image display apparatus related to a third embodiment of the present invention.

FIG. 7 shows a schematic diagram of a three-dimensional image display of the third embodiment of the present invention.

This three-dimensional image display apparatus comprises a display panel 11 which displays two-dimensionally a parallel projection image formed from a plurality of patterns corresponding to a three-dimensional image to be displayed, and an array plate 12 disposed on the front or rear face of the display panel 11 and including a plurality of pinholes 121 or microlens which are two-dimensionally arranged in correspondence with the plurality of patterns.

The display panel 11 comprises a great number of pixels each having subpixels R, G and B each of which is the smallest unit for driving the display panel, the points at which the lines passing through the center of each pinhole (or microlens) 121 from the subpixels intersect the three-dimensional image 22 to be displayed separates from one another. In this time, it is necessary to decide the luminance of each subpixel adequately.

As shown in FIG. 7, the luminance of the image displayed on each subpixel is calculated from luminance of R, G and B at the points at which lines passing through the center of the pinhole 121 from each subpixel cross the three-dimensional image. In a case of a color number display of 24 bits, the color of the three-dimensional image can be played back by setting the luminance of the subpixel R to an R component of the corresponding collar value (one of 0 to 255), the luminance of the subpixel G to a G component of the corresponding collar value (one of 0 to 255), and the luminance of the subpixel B to a B component of the corresponding collar value (one of 0 to 255).

For example, the R subpixel on top is decided by an R component of luminance at a point corresponding to a circle depicted on a line in FIG. 7. The next G subpixel is decided by a G component of luminance at a part shown in a circle depicted in a line. In this way all luminance in a pattern can be decided. The G subpixel which is the first subpixel in the next cycle is decided by a G component of the point shown by a circle in FIG. 7. The luminance of each subpixel in this cycle is decided as the above. The first subpixel in a following cycle is B, and its luminance is decided by a B component of the point shown by a circle in FIG. 7. By the same way, the colors of all subpixels can be decided. In this embodiment, the luminance information of a specific component is used as-is. However, the value obtained by subjecting the luminance of the neighborhood subpixel to a suitable arithmetic processing if necessary may be used.

As described above, since the three-dimensional image 22 is played back by a group of these light beams, the high definition three-dimensional image can be played back by a method to be simple and easy.

FOURTH EMBODIMENT

Figures 8, 9:
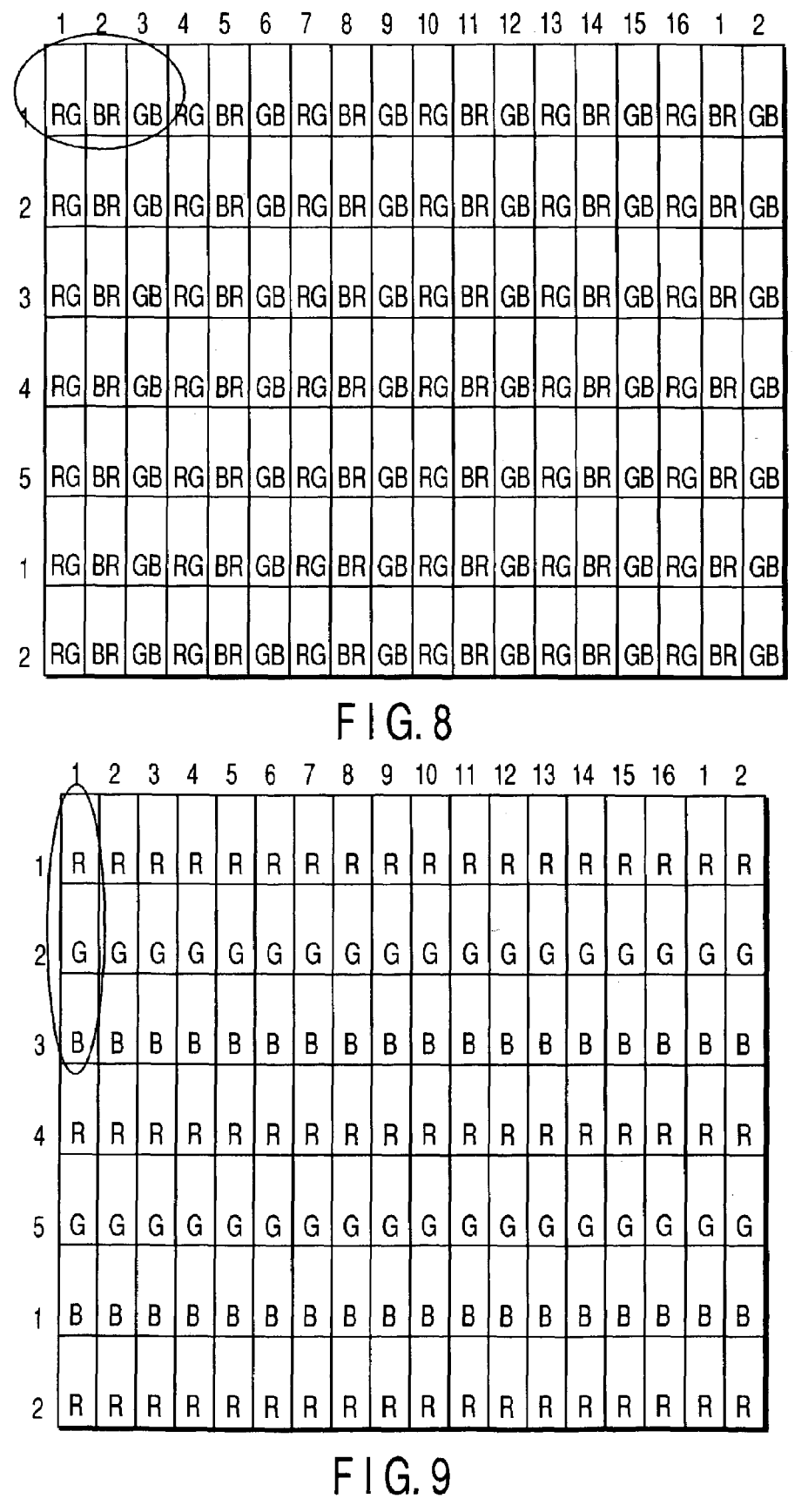

FIG. 8 is a schematic diagram that shows a display panel of a three-dimensional image display apparatus according to the fourth embodiment of the present invention. The part surrounded by a circle expresses a triplet corresponding to one pixel.

As described in the first embodiment, the playback of the high definition three-dimensional image can be realized by the configuration that the points at which lines passing through the center of pinhole or microlens from the subpixels cross the three-dimensional image to be displayed are separated to one another. However, when the three-dimensional image is watched closely near thereto, some color separation can be observed. For this case, the color separation is improved by using a subpixel having a plurality of colors instead of each subpixel of R, G or B that are the smallest unit.

FIG. 8 shows a layout of subpixels and a layout of colors of subpixels. Two colors of R and G are assigned to the subpixel of upper left most. The two colors R and G are assigned to two regions into which a subpixel is divided. Each subpixel may be divided into two regions in a vertical direction, a horizontal direction or a diagonal direction. When a liquid crystal display panel is used as a display apparatus, the layout of the colors enables by changing a color filter to a desired color at the time of manufacturing. In this embodiment, a subpixel is covered by a two-color filter. The first subpixel is covered by a R-G color filter, the second subpixel by a B-R color filter and the third subpixel by a G-B color filter. These first to third subpixels are arranged repeated periodically. Such construction enables s a playback of the high definition three-dimensional image without color separation.

FIFTH EMBODIMENT

FIG. 9 is a schematic diagram of a display panel in a three-dimensional image display apparatus related to the fifth embodiment of the present invention. The part surrounded in a circle shows a triplet of R, G and B.

In the present embodiment, each of subpixels R, G and B which is the smallest drive unit is rectangular. The subpixels R, G and B are vertically arranged along a longitudinal direction of the rectangle. In this case, similarly to the first embodiment, the points at which the lines passing through the center of the pinhole or microlens intersects the three-dimensional image to be displayed are separated from one another. As a result, the high definition three-dimensional image can be played back.

SIXTH EMBODIMENT

Figure 10:
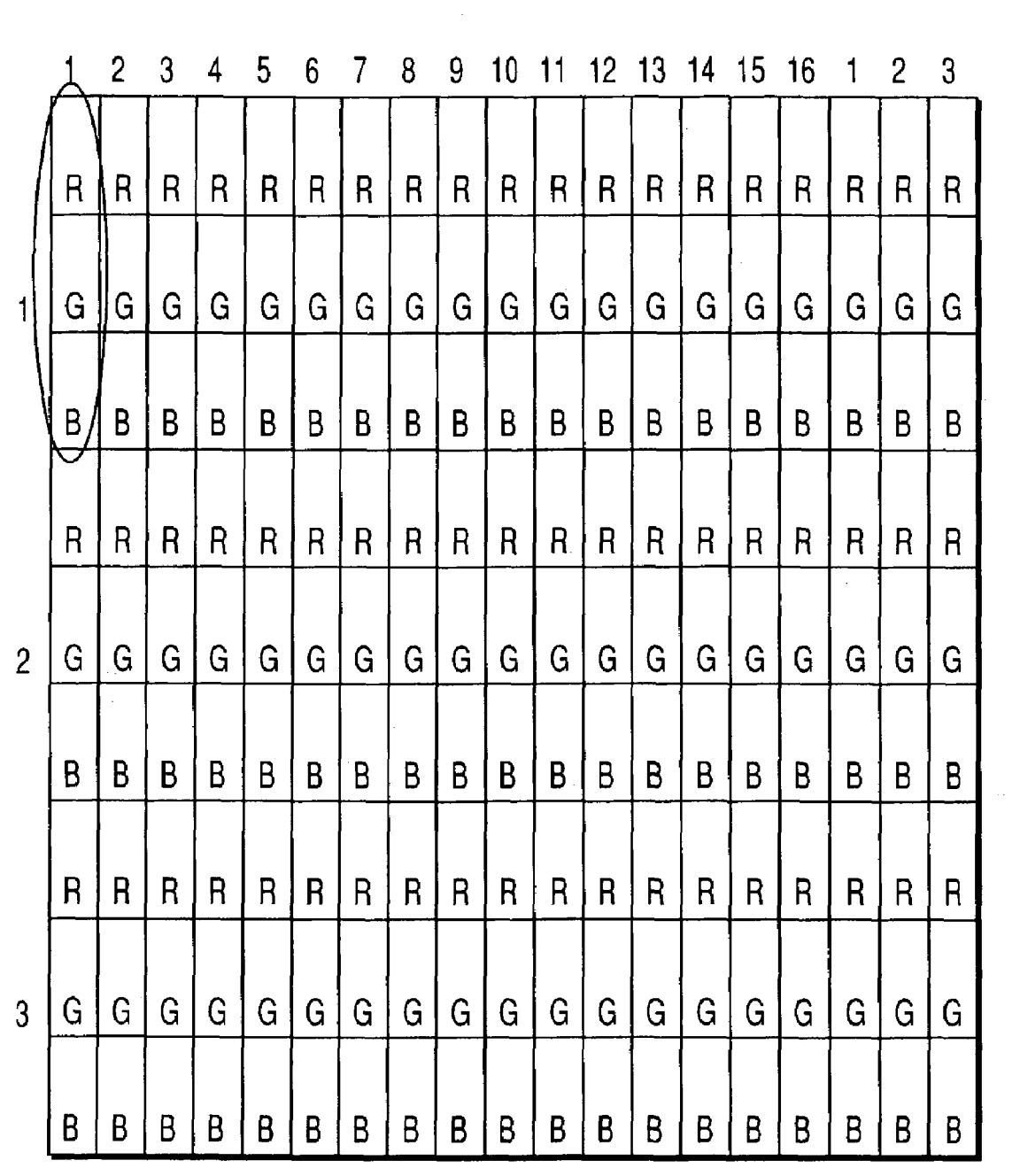

FIG. 10 is a schematic diagram of a display panel of a three-dimensional image display apparatus related to the sixth embodiment of the present invention. The part surrounded by a circle shows a triplet of R, G and B.

The three-dimensional display apparatus of the present embodiment comprises a display panel which two-dimensionally displays a parallel projection image formed from a plurality of patterns corresponding to the three-dimensional image to be displayed and an array plate disposed on the front or rear of the display panel and provided with a plurality of pinholes or a plurality of microlens in correspondence with the plurality of patterns, similarly to the former embodiments. This three-dimensional display apparatus displays a three-dimensional image on at least one of the rear and front of the array plate on which pinholes or microlens are arranged two-dimensionally. The display panel which displays an image two-dimensionally includes a plurality of rectangle subpixels arranged in a matrix. The subpixels of different colors are arranged periodically in a longitudinal direction. The subpixels of the same color are arranged in a horizontal direction.

According to this construction, when viewed the display panel in a horizontal direction, the number of pixels comprising a set of R, G and B (triplet) is a multiple of 3. The number of the light beams in a horizontal direction can be increased by a method to be very simple and easy in this way. Therefore, the high definition three-dimensional image can be played back. In the present embodiment, a visual line is assigned to a set of subsets R, G and B, i.e., a triplet in a vertical direction. For this reason, the number of visual lines in a vertical direction decreases. However, this is no problem since the number of the visual lines in the horizontal direction is more important in three-dimensional vision.

SEVENTH EMBODIMENT

Figures 11, 12:
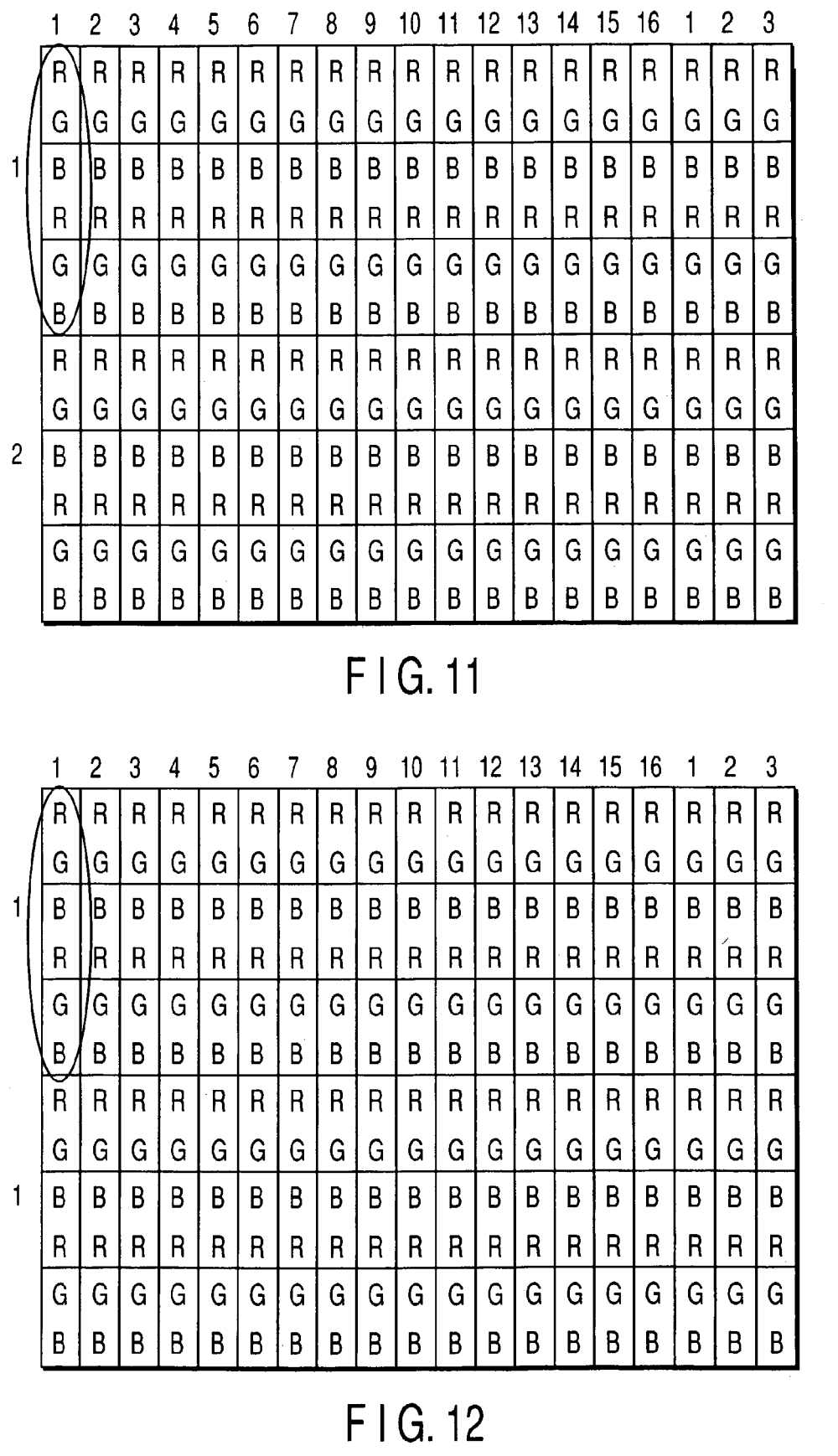

FIG. 11 is a schematic diagram of a display panel of a three-dimensional image display apparatus related to the seventh embodiment of the present invention. The part surrounded by a circle shows a triplet corresponding to one pixel.

The present embodiment is similar to the sixth embodiment, and rectangular subpixels different in color in a vertical direction are arranged periodically in a longitudinal direction. A visual line is assigned to three subpixels in the vertical direction. However, in the present embodiment, a rectangular subpixel displays a plurality of colors.

When one color is assigned to one rectangular subpixel, a pixel including a set of R, G and B is long in a vertical direction. When the longitudinal length of the subpixel is 150 μm, the longitudinal length of the pixel is 450 μm. For this reason, when viewing an image near the display panel, color separation may occur in the longitudinal direction. Thus, in this embodiment, each subpixel is covered by a two-color filter. The first subpixel is covered by a R-G color filter, the second subpixel by a B-R color filter and the third subpixel by a G-B color filter. The first to third subpixels are periodically repeated.

It is assumed that an area ratio of the filter regions of the two colors is, for example, 1:1.

Assuming the luminance of the subpixels of R, G and B are X, Y and Z when one pixel is covered by a one-color filter. In the present embodiment, the luminance X of subpixels displaying R and G is determined by $$x=(X+Y-Z)/2B$$

the luminance y of subpixels displaying B and R is determined by $$y=(X-Y+Z)/2G$$

the luminance z of subpixels displaying G and B is determined by $$z=(-X+Y+Z)/2.$$

The luminance of the light beams of an R component that are emitted from these three subpixels is expressed by a sum of the luminance x of the light beam from the first subpixel and the luminance y of the light beam from the second subpixel. However, since x+y=X, the luminance is the same as the original luminance. The luminance of light beams of each of G and B components is the same as that of the R component. However, in this embodiment, the colors near three primary colors cannot be played back.

More preferably, a ratio of two color regions of the two-color filter can be set to 10:1, for example. In this case, the luminance x of subpixels displaying R and G can be approximately determined by $$x=(100 \times X+Y-10 \times Z)/100$$

the luminance y of subpixels displaying B and R can be approximately determined by $$y=(X-10 \times Y+100 \times Z)/100$$

the luminance z of subpixels displaying G and B can be approximately determined by $$z=(-10 \times X+100 \times Y+Z)/100$$

In this way, the three-dimensional display apparatus can keep color separation very small without hindrance almost in color playback, and plays back a high definition three-dimensional image.

As shown in FIG. 12, the vertical visual line may be set to only one positively. In other words, one visual line is assigned to any triplet in a vertical direction. In this case, there is no vertical motion parallax, but a visual area expands. As a result, the high definition three-dimensional image which is easy to watch is provided.

EIGTH EMBODIMENT

Figures 13, 14:
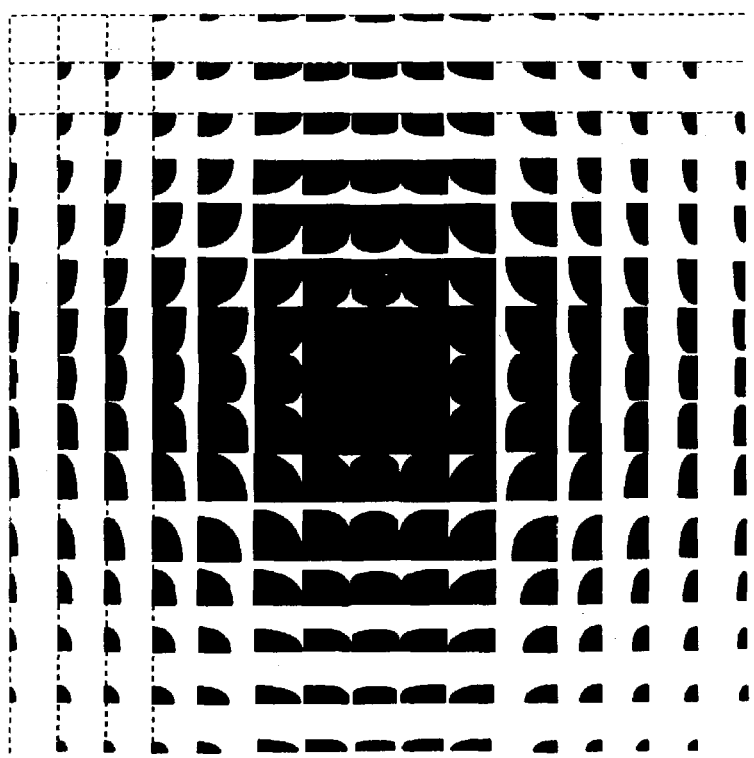
FIG. 13 shows a conceptual diagram of a display panel of a three-dimensional image display apparatus related to a ninth embodiment of the present invention.
FIG. 14 is a diagram for explaining an image compression method according to a three-dimensional image display apparatus related to a tenth embodiment of the present invention.

FIG. 13 is a schematic diagram of a display panel of a three-dimensional image display apparatus related to the eighth embodiment of the present invention. The part surrounded by a circle shows a triplet corresponding to one pixel.

The three-dimensional display apparatus of the present embodiment comprises a display panel which two-dimensionally displays a parallel projection image formed from a plurality of patterns corresponding to a three-dimensional image to be displayed and an array plate disposed on the front or rear of the display panel and provided with a plurality of pinholes or a plurality of microlens in correspondence with the plurality of patterns, similarly to the former embodiments. The display panel displaying the parallel projection image two-dimensionally comprises a number of rectangle subpixels that differ in color in a lengthwise direction and are periodically arranged in a longitudinal direction. The points at which lines passing through the center of a pinhole or a microlens from the rectangular subpixels cross the three-dimensional image are separated. A plurality of colors are displayed by one rectangular subpixel.

A three-dimensional image is displayed on at least one of the back and front of the array plate on which pinholes or microlens are arranged two-dimensionally.

The first to sixteenth horizontal parallaxes are assigned to the subpixels in a horizontal direction, and the first to fifth vertical parallaxes are assigned to subpixels in a vertical direction. A color is played back by three vertical subpixels. The embodiment also can plays back a high definition three-dimensional image.

NINTH EMBODIMENT

FIG. 14 shows a display panel of a three-dimensional image display system related to the ninth embodiment of the present invention.

This figure shows a recording image comprising groups of image elements for displaying a circle three-dimensionally. Each image element is approximately equal to an image obtained by photographing an object with a minute lens. The image element is not limited to photography, and may be drawn in computer graphics. A group of such image elements are displayed so as to correspond to pinholes one by one. The light beam from each pixel passes through the corresponding pinhole. A three-dimensional real image is formed on the front of an array plate having pinholes by condensing the light beam. The image is entropy-encoded by quantizing the DCT coefficients obtained by processing the image using a discrete cosine transform (DCT) as an orthogonal transform, to generate compressed image data. The compressed image data is used as recording image data. This compressed image data is decompressed by an entropy decoding, an inverse dequantization and a discrete cosine inverse transformation to reconstruct an image. In this time, a block to be subjected to a discrete cosine transform is set so as to completely coincide with an image element as shown by dotted lines in FIG. 14. The block and the pixel element can be set to a size of, for example, 8×8 pixels. As a result, the data amount of the recording image can be decreased to around a one-tenth of that of a conventional record image. As a result, the picture quality of the playback three-dimensional image is not most inferiority in comparison with an image that is not compressed. In the present embodiment, the block is set to a size of 8×8 pixels. However, the block is not limited to this size, and may be a size of 16×16 pixels, for example.

TENTH EMBODIMENT

Figure 15:
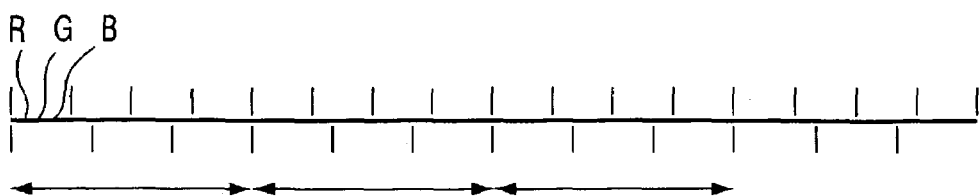
FIG. 15 is a diagram for explaining an image compression method according to a three-dimensional image display apparatus related to an eleventh embodiment of the present invention.

FIG. 15 is a diagram for explaining a three-dimensional display apparatus related to the tenth embodiment of the present invention.

In this embodiment, a recorded parallel projection image is displayed on a display panel. Light beams from subpixels of R, G and B pass through the corresponding pinholes and are condensed. As a result, a three dimensional real image is formed on the front of an array plate having pinholes.

FIG. 15 shows a cross section of the recorded image in this embodiment. The upper short vertical line shows the delimiter of each triplet. In an example, image elements are periodically configured in units of four subpixels. Parallaxes are assigned to these image elements. This period is shown by lower short vertical lines. In this case, DCT may be performed in units of block shown by an arrow to compress the image. In other words, twelve subpixels are set to each block. More specifically, each block is converted in units of four pixels corresponding to the number of pixels the same as that of the subpixels in the image element. As a result, since the block can be converted in units of triplet, there is little degradation in image. Similarly, when the image elements are periodically configured in units of eight subpixels, it is preferable that DCT is performed in units of eight pixels.

ELEVENTH EMBODIMENT

Figure 16:
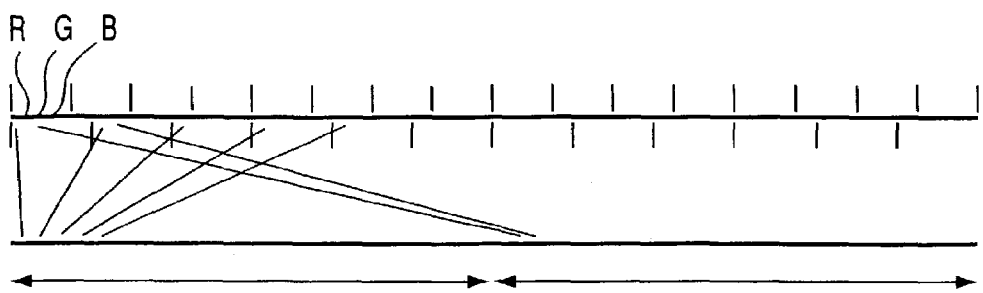
FIG. 16 is a diagram for explaining an image compression method according to a three-dimensional image display apparatus related to a twelfth embodiment of the present invention.

Subpixels R, G, B, . . . are extracted in turn from an image element configured by upper subpixels as shown in FIG. 16, and rearranged in an order of subpixels as shown in a lower part in FIG. 16. Thereafter, this image is compressed. When the image is displayed, the subpixels are reversibly rearranged to form an original arrangement.

Also, in this case, a good three-dimensional image can be played back. This is based on the reason that the image which the subpixels has been rearranged in order is an image watched from a certain viewpoint, and includes no specific unit such as an image element of an image similar to a normal photography image, namely has no periodicity. Therefore, if the image is subjected to a conventional compression, there is little degradation in image quality. As a result, a compression technique such as JPEG or MPEG can be applied to the present apparatus as it is. Other methods can be used. However, it is desirable that an orthogonal transform is performed in units of two exponentiation, because a high-speed arithmetic processing can be done. This compressed image is stored as data. If the subpixels are rearranged back again when a three-dimensional image is played back, a good three-dimensional image is provided.

FIG. 17A shows a block diagram of a three-dimensional image playback apparatus using the compression method described above. The three-dimensional image playback apparatus comprises a recording image forming unit 21 which forms a recording image, a recording image compression unit 22 which compresses image data, a storage medium 23 which stores compressed image data, a decompression unit 24 which decompresses the compressed image data, and a three-dimensional image display unit 25 which displays decompressed image data as a three-dimensional image. The three-dimensional image display unit 25 is constructed as shown in FIG. 1. The forming of recording image may be performed using computer graphics.

Figure 17B:
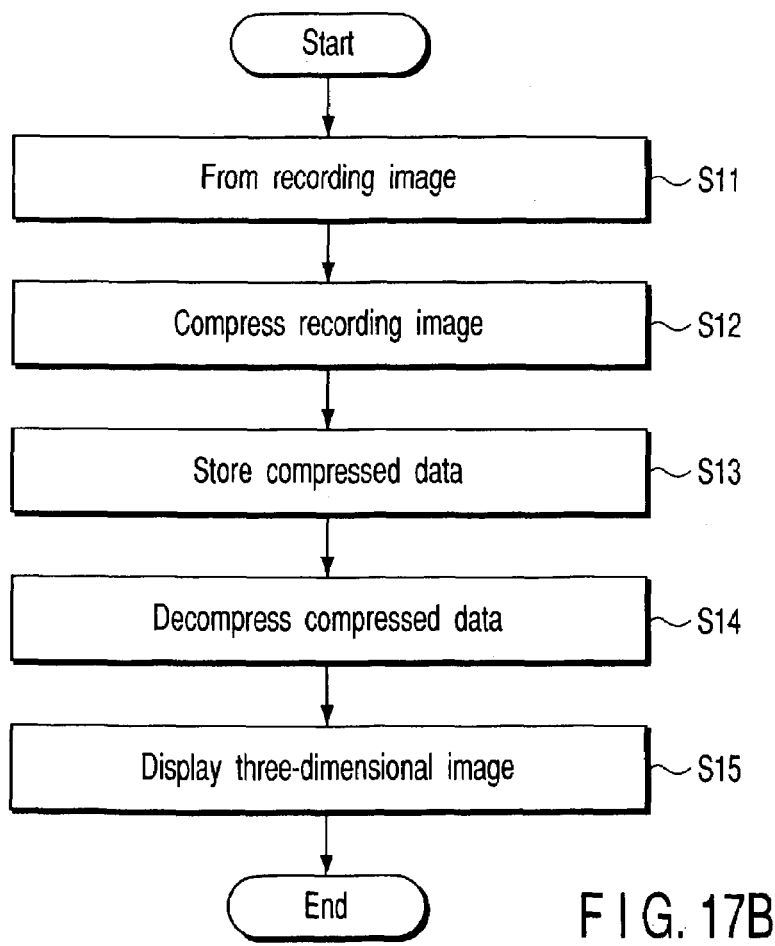
FIG. 17B is a flowchart for explaining an operation of the three-dimensional image playback system of FIG. 17A.

There will now be described an operation of the three-dimensional image playback apparatus of FIG. 17A with reference to a flowchart of FIG. 17B. At first, a parallel projection image is formed as a recording image by the recording image forming unit 21 (S11). The image data of the recording image is sent to the compression equipment 22 to be compressed (S12). The compressed image data is stored in the recording medium 23 (S13). The compressed image data read from the recording medium 23 are sent to the decompression unit 24 to be decompressed (S14). The decompressed image data is sent to the three-dimensional image display unit 25 to be displayed as a three-dimensional image (S15). In the above embodiment, the image compression may be performed by processing algorithm in software using a computer, or by using a dedicated unit including LSI in which algorithm is installed.

An optical disc unit such as DVD and a magnetic disk unit such as HDD may be used as the recording medium 23. The image data decompression may be performed by processing algorithm in software using a computer, or by using a dedicated unit including LSI in which algorithm is installed. A liquid crystal display is used for the three-dimensional image display unit 25 to display the recorded image three-dimensionally. The three-dimensional image can be played back by arranging a pinhole array on the front of the liquid crystal display. By such a configuration, a high definition three-dimensional image can be played back with a little data amount.

The present invention is not limited to the above embodiments. For example, compressed recording image data is transmitted to a remote location using a transmission channel such as an optical fiber, transmission data is decompressed to reconstruct a three-dimensional image. A self emission type display such as a plasma display and an organic EL display can be used other than the liquid crystal display. FIG. 12 shows the apparatus that have no vertical parallax. However, in another embodiment, the configuration that does not have a vertical parallax is possible according to need.

Figure 18:
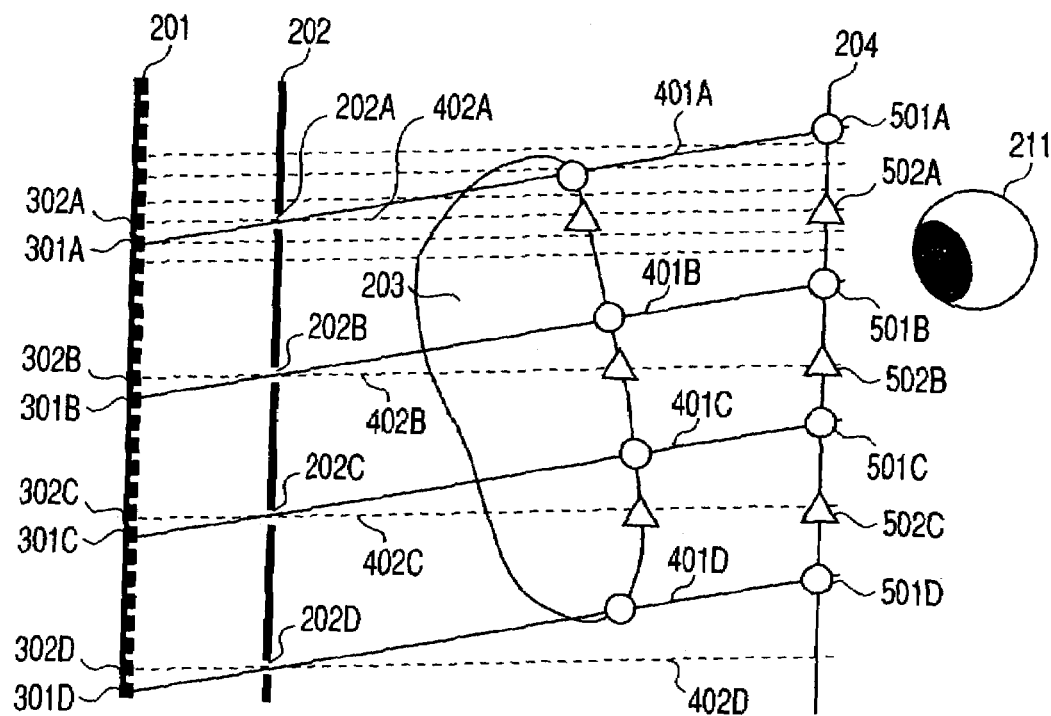
FIG. 18 shows a conceptual diagram for explaining an image formation method.

The three-dimensional image display apparatus can be realized by using a parallel projection image. An image forming method of forming this parallel projection image is described hereinafter. FIG. 18 is a conceptual diagram for explaining the image forming method.

The method forms barn image data used for displaying a three-dimensional image by an integral photography method. For this reason, as shown in FIG. 18, a two-dimensional image display panel 201 such as a liquid crystal display and a pinhole board 202 disposed on the entire surface thereof are used. The pinhole board 202 may be provided with an array of lens two-dimensionally arranged instead of an array of pinholes.

Figure 19:
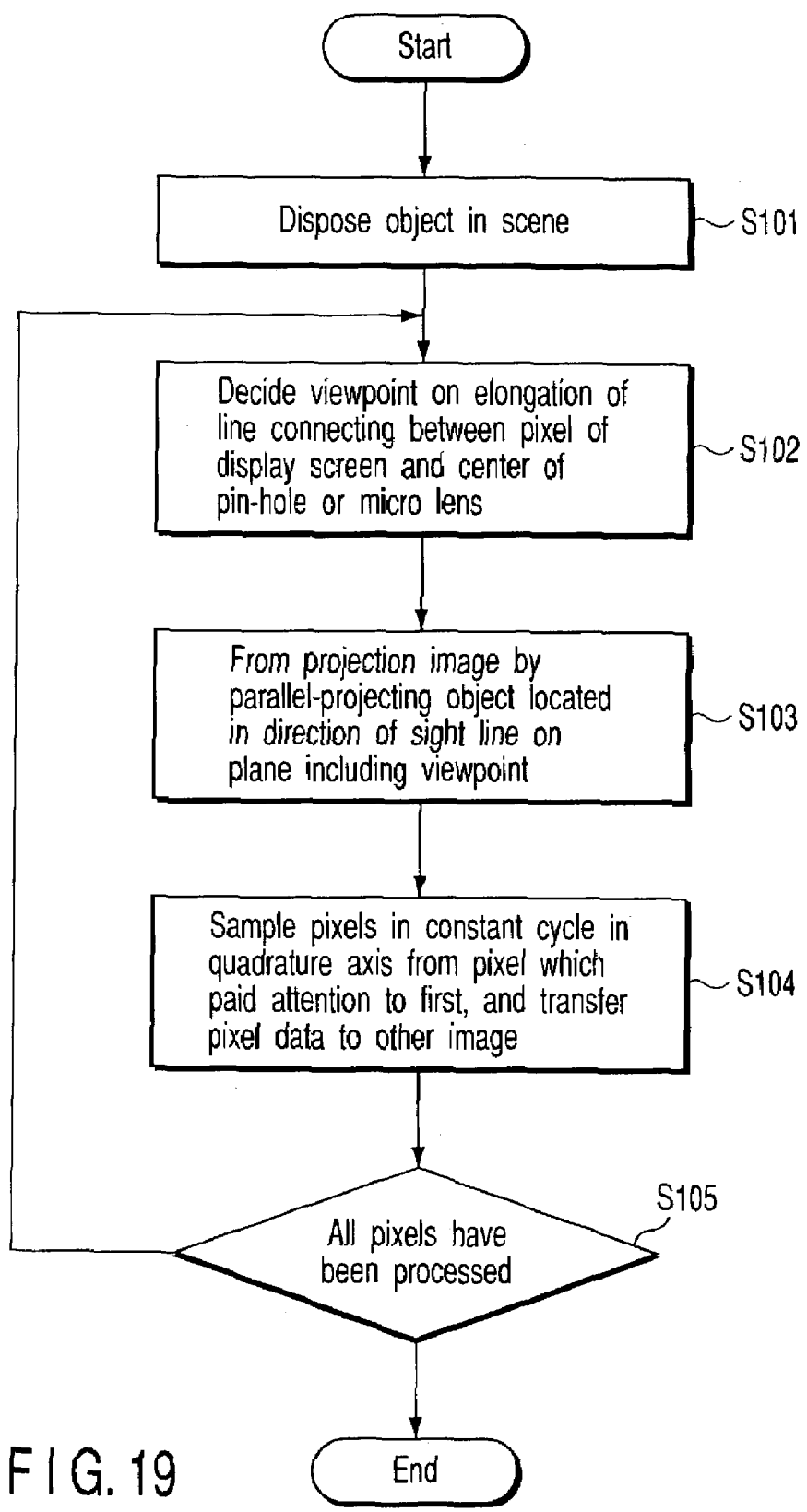
FIG. 19 is a flowchart which shows an algorithm of the image formation method of FIG. 18.

FIG. 19 is a flowchart representing an algorithm of the image forming method. According to this, at first, an object 203 is disposed in a scene (S101). The "object" is an object to be displayed and needs not be an actual object. The object may be, for example, a virtual object three-dimensionally displayed by computer graphics. The "screen" corresponds to a space on which a three-dimensional image representing the object is displayed.

In step S102, a viewpoint is decided on an elongation of a line (visual line) connecting a pixel of a display panel to a pinhole or the center of a lens. In FIG. 8, for example, a visual line 401A connecting a pixel 301A of a display panel 201 and pinhole 202A of pinhole board 202 is formed. A viewpoint 501A is decided on the elongation of the line 401A.

In step S103, an object is projected on a plane including the viewpoint in a direction of the visual line by a parallel projection to form a projection image thereon. In FIG. 18, for example, a plane 204 including a viewpoint 501A is assumed. The object is projected on the plane 204 along the direction of the visual line 401A by the parallel projection. The parallel projection is to form on the plane 204 an image obtained when a viewer 211 looks at the object 203 along the visual line 401A.

If the projection image is drawn on the plane 204, pixels are sampled vertically and horizontally from the pixel paid attention to first in a constant period. The sampled pixel data is transferred to the other screen. In FIG. 18, pixel data in viewpoints 501A, 501B, 501C, 501 . . . are sampled from the projection image of the object 203 that is drawn on the plane 204, and transferred to the image memory of a computer.

These viewpoints 501A, 501B, 501C, 501D ... correspond to pixel data that visual lines 401A, 401B, 401C, 401D ... connecting pixels 301A, 301B, 301C, 301D ... to pinholes 202A, 202B, 202C, 202D ... , respectively, form on the plane 204. In other words, these pixel data correspond image data to be displayed on pixels 301A to 301D to display the image obtained when the viewer 311 views the object 203 from the direction of the visual lines 501A to 501D. Therefore, the sampling period in this step corresponds to the array pitch between the pinholes of the pinhole board 202.

The sampled pixel data includes color data and luminance data to be displayed on each pixel, for example. These pixel data are transferred to a semiconductor memory or hard disk in which an available area capable of storing the image data is reserved by a computer.

In this way, if the pixel data along the visual line of a certain direction is acquired, the process returns to step S102, to decide again a viewpoint on the elongation of a line (visual line) connecting the pixel on the display screen to the pinhole or center of the lens. For example, in FIG. 18, a visual line 402A connecting a pixel 302A of the display 201 to a pinhole 202A of pinhole board 202 is formed, and a viewpoint 502A is decided on the elongation of the visual line 402A.

In step S103, a plane 304 including a viewpoint 502A is assumed. The object 203 is projected on the plane 203 along the visual line 402A by the parallel projection.

In step S104, pixel data in viewpoints 502A, 502B, 502C, 502D ... are sampled from a projection image of the object 203 that is drawn on the plane 204, and transferred to the image memory of the computer.

In this way, the pixel data to be displayed on pixels 302A-302D are generated to display the image obtained when the viewer 211 observes the object 203 from a direction of visual lines 402A-402D, and stored in the image memory. Thereafter, it is checked whether all pixels have been processed (S105). Steps S102 to S104 are repeated till all pixels are processed. The process is finished when all pixels have been processed. If the pixel data generated in this way are synthesized, the pattern image to be displayed on the display panel 201 in order to display three-dimensionally the object 203 is generated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A three-dimensional image display apparatus comprising:
    a display panel which displays a parallel projection image formed from a plurality of patterns corresponding to a three-dimensional image to be displayed; and
    an array plate disposed on a front of the display panel and having a plurality of pinholes arranged two-dimensionally to form the three-dimensional image on a front or a rear of the array plate,
    wherein the display panel includes a number of pixels arranged two-dimensionally in correspondence with the pinholes, wherein each of the pixels comprises a first subpixel, a second subpixel and a third subpixel, and wherein
    a first intersection point, a second intersection point and a third intersection point are formed at the three-dimensional image and are separated from one another, the first intersection point being formed where a first line that passes through one of the pinholes from the first subpixel intersects the three-dimensional image, the second intersection point being formed where a second line that passes through the one of the pinholes from the second subpixel intersects the three-dimensional image, and the third intersection point being formed where a third line that passes through the one of the pinholes from the third subpixel intersects the three-dimensional image.

2. The apparatus according to claim 1, wherein the number of pixels are divided into a plurality of pixel groups, and a given number of the pinholes are arranged for each of the pixel groups.

3. The apparatus according to claim 1, wherein the first subpixel is a red subpixel, the second subpixel is a green subpixel, and the third subpixel is a blue subpixel.

4. The apparatus according to claim 3, wherein a luminance of each of the subpixels is calculated from a luminance of one of the intersection points.

5. The apparatus according to claim 3, wherein each of the subpixels is made up of a multi-color subpixel which can display a plurality of colors.

6. The apparatus according to claim 3, wherein each of the subpixels is rectangular, and wherein each of the subpixels is disposed in a substantially vertical direction along its longitudinal axis.

7. The apparatus according to claim 1, wherein the subpixels of the display panel comprises a plurality of subpixel groups, each of the subpixel groups including a plurality of rectangular subpixels for indicating different colors, and arranged periodically in a longitudinal direction of the rectangular subpixels.

8. The apparatus according to claim 1, wherein each of the rectangular subpixels comprises a multi-color subpixel which can display a plurality of colors.

9. Three-dimensional image playback equipment comprising:
    an image forming unit configured to generate image data of a parallel projection pictorial image formed from a plurality of patterns;
    a compression unit configured to compress the image data;
    a decompression unit configured to decompress the compressed image data and to generate decompressed image data corresponding to the parallel projection pictorial image; and
    the three-dimensional image display apparatus according to claim 1 which displays the three-dimensional image based on the decompressed image data.

10. A three-dimensional image display apparatus comprising:
    a display panel which displays a parallel projection image formed from a plurality of patterns corresponding to a three-dimensional image to be displayed; and
    an array plate disposed on a front of the display panel and having a plurality of microlens arranged two-dimensionally to form the three-dimensional image on a front or a rear of the array plate,
    wherein the display panel includes a number of pixels arranged two-dimensionally in correspondence with the microlens, wherein each of the pixels comprises a first subpixel, a second subpixel and a third subpixel, and wherein
    a first intersection point, a second intersection point and a third intersection point are formed at the three-dimensional image and are separated from one another, the first intersection point being formed where a first line that passes through one of the microlens from the first subpixel intersects the three-dimensional image, the second intersection point being formed where a second line that passes through the one of the microlens from the second subpixel intersects the three-dimensional image, and the third intersection point being formed where a third line that passes through the one of the microlens from the third subpixel intersects the three-dimensional image.

11. The apparatus according to claim 10, wherein the number of pixels are divided into a plurality of pixel groups, and a given number of the microlens are arranged for each of the pixel groups.

12. The apparatus according to claim 10, wherein the first subpixel is a red subpixel, the second subpixel is a green subpixel, and the third subpixel is a blue subpixel.

13. The apparatus according to claim 12, wherein a luminance of each of the subpixels is calculated from a luminance of one of the intersection points.

14. The apparatus according to claim 12, wherein each of the subpixels is made up of a multi-color subpixel which can display a plurality of colors.

15. The apparatus according to claim 12, wherein each of the subpixels is rectangular, and wherein each of the subpixels is disposed in a substantially vertical direction along its longitudinal axis.

16. The apparatus according to claim 10, wherein the subpixels of the display panel comprises a plurality of subpixel groups, each of the subpixel groups including a plurality of rectangular subpixels for indicating different colors, and arranged periodically in a longitudinal direction of the rectangular subpixels.

17. The apparatus according to claim 10, wherein each of the rectangular subpixels comprises a multi-color subpixel which can display a plurality of colors.

18. Three-dimensional image playback equipment comprising:
   an image forming unit configured to generate image data of a parallel projection pictorial image formed from a plurality of patterns;
   a compression unit configured to compress the image data;
   a decompression unit configured to decompress the compressed image data and to generate decompressed image data corresponding to the parallel projection pictorial image; and
   the three-dimensional image display apparatus according to claim 10 which displays the three-dimensional image based on the decompressed image data.

* * * * *